United States Patent

Streckmann

[15] 3,651,280

[45] Mar. 21, 1972

[54] RECORDING AND REPRODUCING APPARATUS

[72] Inventor: George L. Streckmann, Dallas, Tex.

[73] Assignee: Intermedcraft Corp., Columbia, Md.

[22] Filed: Apr. 1, 1969

[21] Appl. No.: 811,856

[52] U.S. Cl. .............179/100.2, 128/2.06 R, 179/100.2 MD

[51] Int. Cl. .............A61b 5/04

[58] Field of Search .............128/2.05 Q, 2.05 R, 2.05 S, 128/2.06 A, 2.06 B, 2.06 G, 2.06 R; 179/100.2 MD, 101; 330/69, 103; 329/106; 332/2, 14, 15, 46, 52

[56] References Cited

UNITED STATES PATENTS

| | | | |
|---|---|---|---|
| 2,950,352 | 8/1960 | Belck | 179/100.2 |
| 3,280,270 | 10/1966 | Allington | 179/100.2 |

*Primary Examiner*—William E. Kamm

*Attorney*—Kanz, Glaser & Harwood

[57] ABSTRACT

Disclosed are novel encoder and decoder networks for respective incorporation into magnetic medium recording and reproducing apparatus. The encoder includes a pulse generating operational amplifier with positive and negative feedback, the input signal and a capacitor coupled to the inverting input of the operational amplifier. The decoder includes a pulse generating operational amplifier, the input signal respectively coupled to the non-inverting and inverting terminals of the operational amplifier through a resistor and paralleled combination of diodes connected in opposite polarity, a capacitor coupled to ground from the inverting terminal of the amplifier. The magnetic recording and reproducing apparatus is employed in electrocardiographic monitoring apparatus having dual channels for the simultaneous recording or reproduction of EKG signal information from a human being and voice communication from that human being.

5 Claims, 4 Drawing Figures

INVENTOR
GEORGE L. STRECKMANN

Konz, Glaser, and Harwood

ATTORNEYS

RECORDING AND REPRODUCING APPARATUS

This invention pertains to recording and reproduction apparatus, more particularly to electrocardiographiac monitoring apparatus, and even more particularly to portable magnetic tape apparatus adapted to simultaneously record or playback EKG and audio signals.

Within the field of medical technology, and particularly within the field of medical electronics, there is an ever increasing demand for reliable monitoring and diagnostic apparatus, specifically electrocardiographic (EKG) apparatus which may be employed to determine the characteristics of the heart. Most of this apparatus to date has been fairly large and bulky necessitating the examination of the patient within an office or hospital room in which the equipment is situated.

In order for effective and reliable diagnosis to be performed, however, it is desirable, if not critical, that a continuous monitoring of EKG signals be carried out while the patient is engaged in various type activities. This continuous monitoring, however, is impossible with fixed situs monitoring equipment.

There has recently been proposed, therefore, a type of portable magnetic tape recording apparatus adapted to be worn by the person whose EKG signals are being monitored. The EKG signals are initially recorded on magnetic tape while the person is engaged in various type activities, and later played back through visual or audio display means for evaluation by the trained technician or doctor. While the apparatus offers many advantages over the fixed situs equipment, the existing models on the market are not entirely satisfactory.

It is therefore a primary object of the invention to provide improved electrocardiographic monitoring apparatus utilizing recording means adapted to be worn or carried about by the person whose EKG signals are being monitored.

It is another object of the invention to provide EKG monitoring apparatus which can simultaneously record or playback EKG signals as well as voice communications information from the patient indicating in what type of activity he is engaged while these EKG signals are being produced.

It is a further object of the invention to provide novel encoding means for modulating an electrical signal, the encoding means particularly adapted for incorporation into a portable magnetic tape recorder, the modulator being unaffected by variations of tape speed.

It is a still further object of the invention to provide novel circuitry for the decoding of reproduced signals in the playback portion of magnetic tape apparatus.

In accordance with these and other objects, the present invention is primarily directed to apparatus for recording and/or reproducing electrocardiac signals obtained from a human being simultaneous with the recording and/or reproduction of audio signals representative of the voice communication of that human being. The audio signal and EKG signal are respectively recorded initially on two tracks of a magnetic tape, the information on the magnetic tape being played back at a later time. Encoding circuitry embodied within the recorder modulates the electric signal containing the cardiac information to an output signal comprising a series of positive and negative pulses, the ratio of the width of the negative pulse to the width of the positive pulse being proportional to the amplitude of the said electrical signal. Decoding circuitry within the reproducer effectively restores the reproduced EKG signal from the magnetic tape to the same waveshape as the modulated signal within the recorder.

Additional features as well as other advantages and objects of the invention will become readily apparent from the following detailed description taken in conjunction with the accompanying drawing, wherein.

Figure 1:
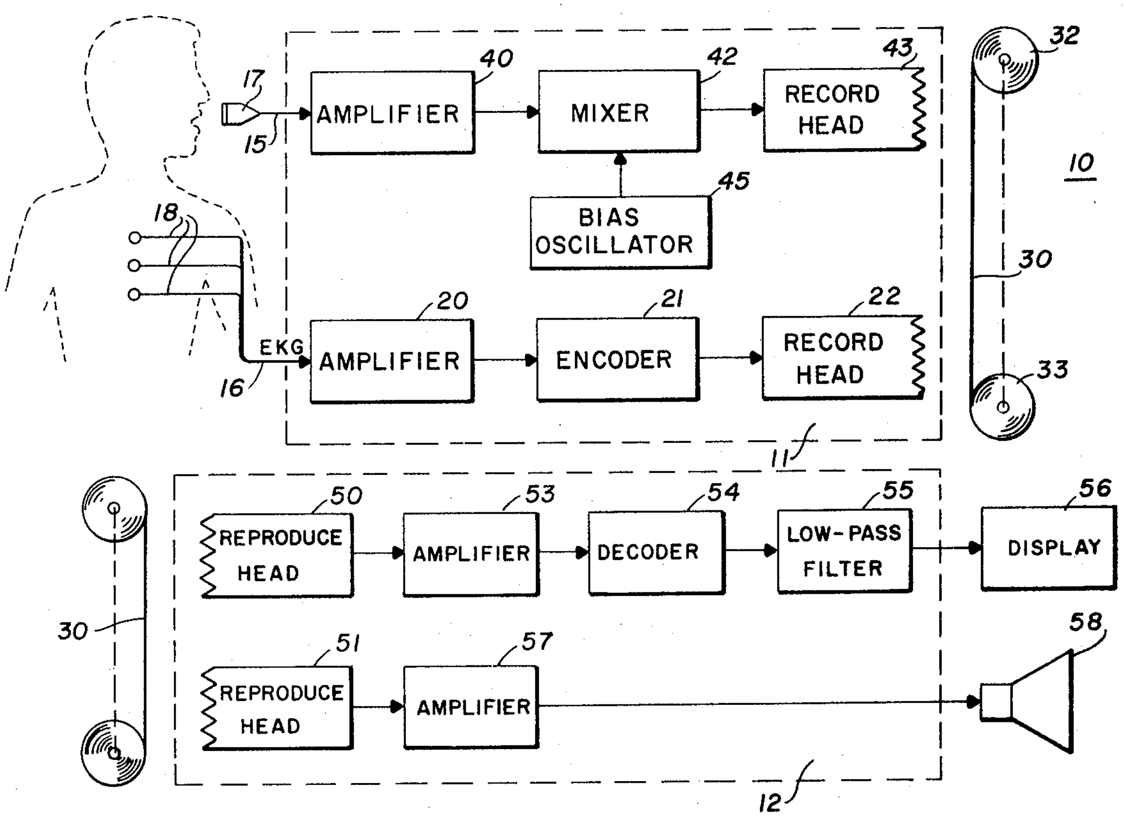
FIG. 1 is the block diagram schematic of the record and reproduce portions of the apparatus of the invention.

Referring now to FIG. 1, the electrocardiograph means 10 embodying the invention includes a record portion 11 and a reproduction or playback portion 12. Both the record and playback portions are essentially dual channel systems for respectively recording and playing back both EKG signal information monitored from a patient simultaneous with voice communication from that patient.

The record portion 11 of the electrocardiograph means 10 is embodied within a portable magnetic tape recorder which is designed to be worn or carried by the patient whose EKG signals are being monitored. The recorder is therefore sufficiently small and compact that the patient may carry it about while engaging in normal or controlled activities. Dual channel inputs 15 and 16 are respectively coupled to a microphone 17 for receiving voice communication from the user; and a plurality of conductors 18 which are electrically connected to one or more electrodes disposed in specified locations upon the patient's skin, as observed in FIG. 1. This dual channel input arrangement thus allows the monitoring of the EKG signals being produced while the patient is engaged in specific activity, as well as a simultaneous voice recording by the patient indicating what type of activity is then being carried on.

The EKG signal, as it appears within the channel 16, has the widely known waveform which includes a P wave which is normally a small positive pulse corresponding to the initial impulse triggering the commencement of the heart beat; a QRS complex coinciding with the actual expansion and contraction of the cardiac muscle producing the pumping action of the heart; and a T wave representing the end of the heart beat.

This EKG wave within the channel 16 is fed or coupled to an amplifier 20 of conventional design which desirably amplifies all of the frequency components in the EKG signal with a minimum of distortion, thereby to provide a signal at the output of the amplifier 20 which is a faithful reproduction of the EKG signal, although of increased amplitude. The output of the amplifier 20 is coupled to an encoder 21 which converts or modulates the amplified EKG signal to a carrier signal form suitable for recording directly onto the magnetic tape 30. The characteristics and the design of the encoder means 21 constitutes a novel feature of the invention, and will be described in more detail below.

The output of the encoder is thereafter electrically connected to a record head 22 which is adapted to record the resulting encoded signal on one of two side-by-side tracks located on the magnetic tape 30. The particular type of magnetic tape transport is not critical to the invention, and may include one of a variety of systems presently on the market. In the illustration shown in FIG. 1, the magnetic tape 30 is advanced by way of supply and takeup reels 32 and 33, respectively.

Simultaneous with the recording of the EKG signal, an audio signal representative of the voice communication of the patient is transmitted from the microphone 17 through the channel 15 to the amplifier 40. The amplified audio signal thereafter passes through a conventional mixer 42 coupled to a bias oscillator 45 and the resulting signal is recorded by way of the record head 43 upon a second track of the magnetic tape 30. The record heads 22 and 43 are appropriately spaced with respect to the magnetic tape 30 to provide a correlation between the information contained in the recorded EKG signal and the information contained in the audio signal. Consequently, the patient whose EKG signals are being recorded may orally indicate what type activity he is engaged in which is producing the particular EKG signals.

The reproduction portion 12 of the electrocardiac tape recorder 10 also comprises a dual channel system for converting the audio and EKG signal information which has been recorded on the tape 30 into readable and useable form. Accordingly, a pair of playback or reproduce heads 50 and 51 simultaneously scan the two tracks on the magnetic tape 30 to play back the recorded EKG signal and the audio signal respectively.

The reproduce head 50 is electrically coupled to the input of the amplifier 53, the amplifier boosting the received signal to a useable level. It has been observed that the reproduction of the recorded EKG signal by the reproduce head 50 produces an output signal from the head 50 which is not only a derivative of the originally recorded signal, but includes considerable distortion and "drop out" due to the irregularities introduced by the tape movement and by imperfections of the oxide coating of the tape. The output of the amplifier 53 is therefore coupled to a decoder 54 which effectively restores the amplified signal to essentially the same wave shape of the output signal from the encoder 21 in the record portion. The decoder 54 is, in itself, of novel design, and constitutes a particular feature of the invention, and will be described in greater detail below.

The output signal from the decoder 54 is thereafter passed through a low pass filter 55 of conventional design, the resultant output signal then being of substantially the same wave shape as the originally monitored EKG signal within the channel 16. The output of the filter 55 is thereafter coupled to display means 56, which may be a cathode ray oscilloscope or strip chart recorder, for example, for visual presentation of the originally recorded EKG signals.

Simultaneous with the reproduction of the recorded EKG signals is the reproduction of the recorded audio signals. Accordingly, the recorded audio information is reproduced by way of playback head 51, and subsequently amplified and shaped by conventional amplifier 56, where the resultant signal is coupled to a loud speaker or earphone means 58. As a consequence of the simultaneous reproduction and display of the EKG and audio signals, a doctor or technician, for example, is able to more meaningfully evaluate the EKG information since he is simultaneously receiving a vocal transmission of the type of activity in which the patient was engaged during the monitoring of the EKG signals.

The record function of the monitored EKG signals requires the modulation or encoding of the signal at the output of the amplifier 20 to a form which is suitable for recording directly onto the magnetic tape 30. To effectively accomplish this purpose, the encoding means 21 must be able to modulate or encode the low frequencies ordinarily associated with the EKG information signal. In addition, however, the record apparatus 11 is specifically adapted to be worn or carried by a patient while being engaged in various activities; consequently the continual movement of the recorder results in variations in the speed of the tape. As a result, any encoding approach which employs frequency modulation will introduce undesirable distortion to the output signal.

In accordance with a specific feature of this invention, therefore, the encoder 21 is so designed to be independent of the rate of travel of the magnetic tape itself, i.e., the modulation technique is independent of frequency variations. The novel design of this encoder is illustrated in detail in FIG. 2 wherein an operational amplifier 70 of the type generally known in the art has its negative input terminal coupled through the resistor $R_1$ to the terminal A, and the positive input terminal of the operational amplifier 70 is connected to ground through the resistor $R_3$. Resistors $R_2$ and $R_4$ provide positive and negative feed back resistance, respectively. The capacitor $C_1$ connects the negative input terminal of the operational amplifier to ground, as illustrated.

Figure 2:
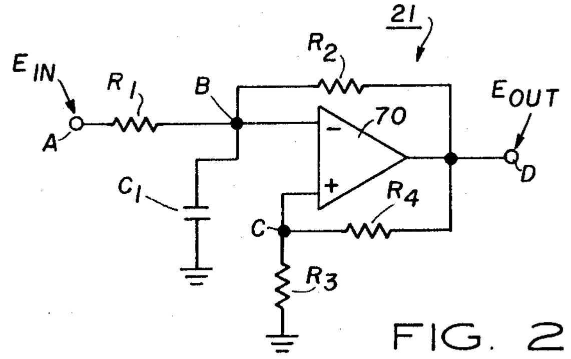
FIG. 2 is the circuit schematic of the novel encoder incorporated within the record portion of the apparatus illustrated in FIG. 1.

There is now described the operation of the circuit of FIG. 2. Assume the voltage $E_{OUT}$ at the output terminal D is positive by an amount (+V). Under this condition, the voltage at the terminal C will be equal to $(R_3/_{R\ +R}\ )$ V. As the capacitor $C_1$ charges, the voltage at the terminal B moves toward a maximum value equal to $[(R_1/_{R\ +R}\ )(V-E_{IN})+E_{IN}]$. However, when the voltage at terminal B becomes equal to the voltage at terminal C, the output voltage $E_{OUT}$ becomes −V due to the regenerative action of the operational amplifier 70, and the voltage at terminal C now becomes $-V(R_3/_{R\ +R}\ )$. The capacitor now begins to charge in an opposite direction to drive the voltage at the terminal B toward a value equal to $[(R_1/_{R_1+R_2})(-V-E_{IN})+E_{IN}]$, but when the voltage at terminal B equal the voltage at terminal C, the output voltage $E_{OUT}$ again becomes +V, and the cycle repeats.

If the signal at the input terminal $A(E_{IN})$ is positive, the charging rate of the capacitor $C_1$ is faster during the time the output voltage $E_{OUT}$ is positive than when the output voltage is negative. In other words, for a positive input signal, $E_{IN}$, the positive pulse width at the output of encoder 21 is shorter than the negative pulse width. On the other hand, if the input signal $E_{IN}$ is negative, the reverse is true, and the positive pulse width at the encoder output is longer than the negative pulse width. When the signal is zero at the input terminal A, the capacitor charges at an equal rate for the positive and negative output cases, and the positive and negative output pulse widths are thereby equal. Thus, the ratio of the negative to positive pulse widths at the output of the encoder 21 is proportional to the amplitude of the input signal, $E_{IN}$ at the input terminal A; and the output signals from the encoder 21 are essentially independent of frequency changes due to the variations in tape speed of the magnetic tape 30. This encoding technique provided by the circuit 21 can be referred to as pulse width ratio modulation.

Figure 3:
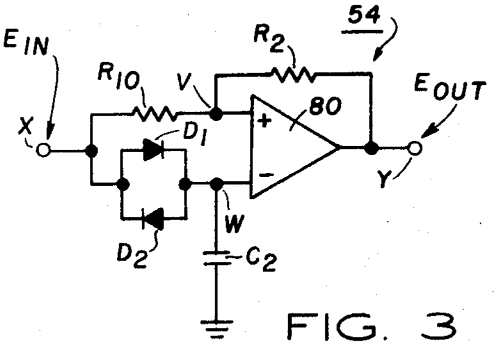
FIG. 3 is the circuit schematic of the novel decoder incorporated within the playback portion of the apparatus illustrated in FIG. 2.

Referring now to FIG. 3, there is described the novel circuitry embodied in the decoder 54. It is to be noted that the signal reproduced by the playback head 50 is a function of the magnetic recordings traveling past this head; consequently, the signals fed into and through the amplifier 53 are actually derivatives of the encoded EKG signals on the tape 30. In addition, due to imperfections and bumps on the tape itself, there is additional distortion or "drop out" associated with the amplified output signal from the amplifier 53. Before this signal is passed through the low pass filter 55, therefore, a decoding function must be performed to restore this amplified signal to essentially the same wave shape of the output signal from the encoder 21.

Figure 4:
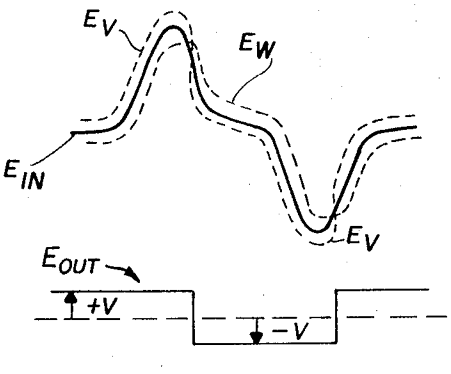
FIG. 4 is a graph of the output signal of the decoder illustrated in FIG. 3 as a function of input signal.

Accordingly, an operational amplifier 80 has its positive input terminal connected through a resistor $R_{10}$ to the input terminal X, and its negative input terminal connected through a paralleled combination of diodes $D_1$ and $D_2$ to the input terminal X. A feedback resistor $R_2$ is connected between the output terminal Y and the terminal V, and the capacitor $C_2$ is connected to ground from the terminal W. The operation of this circuit can be described as follows. With the presence of positive input signal $E_{IN}$ at the terminal X, the output signal $E_{OUT}$ at the terminal Y is +V and remains constant until the voltage $E_v$ at the terminal V drops just below the voltage present at the terminal W. At this point, the output pulse $E_{OUT}$ becomes −V and remains −V until the voltage $E_v$ at terminal V once again exceeds the voltage $E_w$ at terminal W. This output pulse $E_{OUT}$ is illustrated in FIG. 4 for the stated conditions of the input signals $E_{IN}$, and voltages at terminals V and W, the resulting signal thereafter coupled to the filter 55.

It may thus be seen that electrocardiac monitoring apparatus has been provided which includes a compact and portable magnetic tape recorder adapted to be worn by the individual from which the EKG signals are received, the recorder having the capability of simultaneously recording the EKG signal information as well as audio signals representative of the voice communication from the patient about the type of activity he is engaged in. The reproduce portion has the capability of simultaneously playing back the EKG signal and audio information to enable a more effective evaluation of the characteristics of the patient's heart. It is to be specifically pointed out that, while the novel circuitry of the encoder 21 and decoder 54 is particularly suited for incorporation within the overall monitoring apparatus, they are not limited to such use and may be employed whenever electrical signal modulation or demodulation is desired.

Various other modifications and changes may be made to the disclosed embodiments of the invention by persons skilled in the art without departing from the spirit and scope of the invention as defined by the appended claims.

What is claimed is:

1. Magnetic tape reproducing apparatus, comprising:
   a. a playback head for reproducing signals previously recorded on a track of magnetic tape, the resultant output signals from said playback head being derivatives and distortions of said previously recorded signals,
   b. decoding means for restoring said output signals to the waveshape of said previously recorded signals, said decoding means comprising an input and output terminal; an operational amplifier with inverting and noninverting inputs having its output coupled to said output terminal, a capacitor coupled from said inverting input to ground, the non-inverting input coupled to said input terminal; and a paralleled set of diodes in opposite polarity relationship coupled between said input terminal and said inverting input of said operational amplifier; and
   c. display means for displaying signals which are a function of the output signals from said decoding means.

2. Magnetic tape recording apparatus, comprising:
   a. means for converting information into an electrical signal representative of said information,
   b. encoding means for modulating said electrical signal to produce a plurality of output pluses representative of the amplitude of said electrical signal, said encoding means comprising an input terminal and an output terminal, an operational amplifier having inverting and non-inverting inputs thereof, said inverting input being connected with said input terminal, the output of said operational amplifier being connected to said output terminal, a pair of feedback resistors respectively coupled from the output of the operational amplifier to the inverting and non-inverting inputs of the operational amplifier, and a capacitor coupled from said inverting input to ground, and
   c. means for recording said output pulses on magnetic tape.

3. Apparatus for recording onto magnetic recording medium, signals representative of cyclically varying electrical signals received by said apparatus, comprising:
   a. encoder means for producing a series of positive and negative square wave pulses, including control means for determining the relative width of said positive and negative square wave pulses, said encoder means comprising an operational amplifier having a pair of feedback resistors respectively coupled from its output to the inverting and non-inverting input terminals of said amplifier, said control means including a capacitor coupled from said inverting terminal to ground, and means coupling said cyclically varying electrical signals to said inverting input terminal, and
   b. means coupled to the output of said encoder for recording onto magnetic recording medium signals representative of said square wave pulses.

4. In a magnetic recording apparatus of the type comprising first means for producing amplitude varying electrical signals representative of information being monitored and second means for recording onto magnetic recording medium signals representative of said amplitude varying electrical signals, the improvement comprising encoder means between said first and second means for converting said amplitude varying electrical signals into pulses which are a function of the said amplitude, said encoder comprising pulse generating means having a pair of input terminals and an output terminal, said output terminal being coupled to said second means, pulses being generated at the output terminal in response to the voltage difference across said input terminals passing through zero, said pulse generating means being an operational amplifier, the input terminals of which are provided by the inverting and non-inverting terminals thereof, and third means comprising a capacitor having one end coupled to the inverting terminal and the other end coupled to ground, the charging time of said capacitor being determined by the sign of the amplitude varying electrical signals, the amplitude varying electrical signals also being coupled to said inverting terminal, and a pair of feedback resistors respectively coupled from the output terminal of said operational amplifier to the inverting and non-inverting terminals thereof.

5. Reproducing apparatus, comprising:
   a. playback means for reproducing signals previously recorded onto magnetic recording medium, thereby to produce amplitude varying electrical signals from said playback means which are functions of said previously recorded signals,
   b. decoding means for producing output pulses responsive to the maximum and minimum peaks of said amplitude varying electrical signals, said decoding means comprising an operational amplifier having inverting and non-inverting input terminals and an output terminal, pulses being produced at said output terminal solely in response to when the magnitude of the voltage at one of said input terminals exceeds the magnitude of the voltage at the other of the said input terminals, and means coupled to said pair of input terminals for producing said excess voltage conditions across said input terminals in response to the maximum and minimum peaks of said amplitude varying electrical signals, and feedback resistor means coupled from the output of the operational amplifier to the said non-inverting terminal, and
   c. means coupling said output terminal to display means for displaying said reproduced signals.

* * * * *